United States Patent [19]

Gray

[11] 4,188,149
[45] Feb. 12, 1980

[54] SKIN WELDED JOINT

[75] Inventor: Laurence W. Gray, Amherstview, Canada

[73] Assignee: Canadair Limited, Montreal, Canada

[21] Appl. No.: 896,388

[22] Filed: Apr. 14, 1978

[30] Foreign Application Priority Data

Jan. 13, 1978 [CA] Canada .................................. 294944

[51] Int. Cl.² ........................................ F16B 5/08
[52] U.S. Cl. ..................................... 403/271; 52/483
[58] Field of Search ............... 52/483, 772, 780, 281, 52/282; 403/270, 271, 272

[56] References Cited

U.S. PATENT DOCUMENTS

| | | | |
|---|---|---|---|
| 2,679,305 | 5/1954 | Gunthorp | 403/270 |
| 3,115,572 | 12/1963 | Taschinger | 219/127 |
| 3,334,007 | 8/1967 | Flagan | 52/483 X |
| 3,692,354 | 9/1972 | Tuerk | 52/281 X |

Primary Examiner—Carl D. Friedman
Attorney, Agent, or Firm—A. Lebrun

[57] ABSTRACT

A skin welded joint comprising a thin metallic skin welded to a metallic frame member such as a metallic post or beam such as to substantially avoid local distortion, discoloration, and/or physical degradation of the skin and the resultant loss of appearance and/or strength. This skin welded joint comprises an elongated frame member, such as a post or beam, including one flange adjacent the skin, laterally spaced apart ribs projecting from one side of the flange and in contact with the skin, and a pair of flange portions integrally extruded with the ribs and the remainder of the elongated frame member. The flange portions laterally project on opposite sides of the flange, have a reduced thickness relative to the flange, for readily deformation under the heat of welding, and are welded to the skin.

10 Claims, 4 Drawing Figures

SKIN WELDED JOINT

FIELD OF THE INVENTION

The present invention relates to a welded joint of the type connecting a metallic skin to a metallic frame member or stud.

DESCRIPTION OF THE PRIOR ART

The welding of thin or light-gauge metallic skins or sheets to metallic frame members or studs with the conventional welding methods which have been used so far does not produce a satisfactory result at least for some applications such as for the outer skin of a railway passenger car. For such car and in particular for a passenger car of an urban transit system, it is desired to optimize the appearance.

It has been noted that the welding methods and welded joints produced so far resulted in local distorsions and/or discoloration of the thin metallic skins, such as of 5 mm or less. The appearance of such welded skin is therefore spoiled by such local distortions and/or discolorations which are readily revealed by light reflection on the skin.

The U.S. Pat. No. 3,115,572 has proposed a method to avoid the above mentioned distortion. However, this method involves using a skin specially made with external ribs to weld along the thicker portions or strips thus formed in the skin. This patented method results in an uneven external face which is found undesirable.

SUMMARY OF THE INVENTION

It is a general object of the present invention to provide a welded joint particularly adapted to attach a thin metallic skin to a frame member and which substantially avoids the above mentioned disadvantages.

It is a more specific object of the present invention to provide a skin welded joint wherein the metallic skin is welded to a metallic frame member in a manner to avoid distorsion of the skin.

It is a further object of the present invention to provide a skin welded joint wherein the metallic skin is welded to a metallic frame member which is provided with readily deformable flanges such that upon welding of the latter to the skin, the deformable flanges will absorb the distorsions rather than the skin.

It is another object of the present invention to provide a skin welded joint having a metallic skin welded to a metallic frame member provided with readily deformable flanges and wherein the skin between the welds acts as a strengthening flange supplementing the strength of the frame member and allowing to achieve a minimal weight design.

BRIEF DESCRIPTION OF THE DRAWINGS

The above and other objects and advantages of the present invention will be understood with reference to the following detailed description of preferred embodiments thereof which are illustrated, by way of examples, in the accompanying drawings; in which.

DETAILED DESCRIPTION OF PREFERRED EMBODIMENTS

Figure 2:
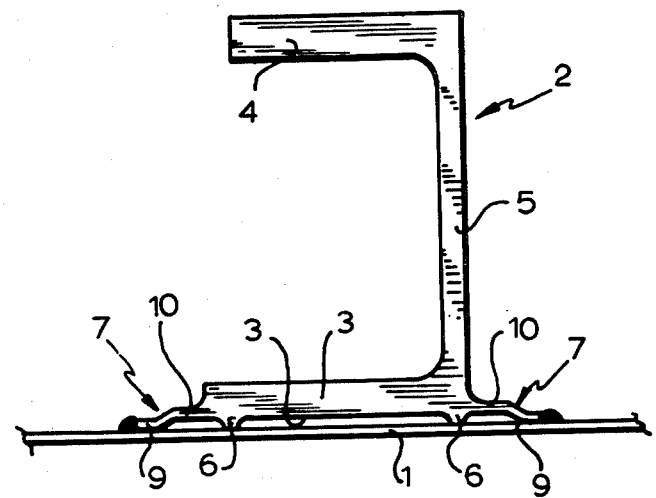
FIG. 2 is an end view of the frame member of FIG. 1 operatively welded against one face of a metallic skin and cooperatively forming therewith a skin welded joint according to the first embodiment of the present invention.
Figure 3:
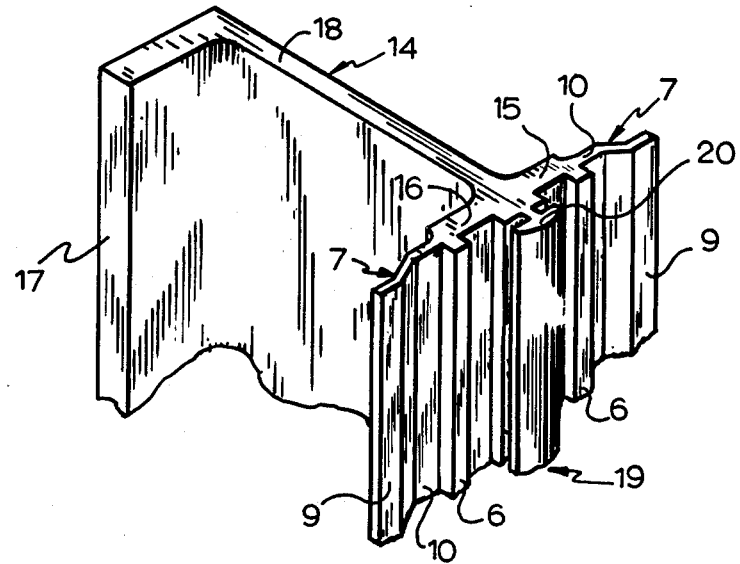
FIG. 3 is a perspective view of one end of a metallic frame member to form part of a skin welded joint according to a second embodiment of the present invention.

The skin welded joint shown in FIG. 2 comprises a thin metallic skin 1 such as of aluminum against one face of which is welded an elongated metallic frame member 2 preferably of extruded aluminum. The skin 1 is only a few millimeters thick and of uniform thickness throughout such that the outside face, on the other side relative to the frame member 2, is intended to be very uniform without any distorsion. This is desired for instance for the skin of the new generation of railway passenger cars for urban transit system and could be applicable to other passenger vehicles such as buses, and elsewhere.

The elongated metallic frame member 2 has the general shape of a channel member including a pair of parallel flanges 3 and 4 and the interconnecting web 5. The flange 3 constitutes a main body portion and the metallic frame member 2 further includes a pair of rib portions 6 and flange portions 7 preferably integrally extruded therewith. The rib portions 6 and the flange portions 7 project a predetermined distance from the external side 8 of the flange 3 and extend lengthwise parallel to the elongated frame member 2.

Each flange portion 7 includes an outer longitudinal edge portion 9 contacting the inner one face of the skin 1 against which the rib portions 6 are also abutting. Each flange portion 7 also includes an inner longitudinal edge portion 10 transversely extending intermediate the corresponding outer longitudinal edge portion and the flange 3. Each inner longitudinal edge portion 10 is spaced from the inner one face of the skin, has a smaller thickness than the flange 3, and is thus made more readily deformable by the heat of welding than the skin 1. Thus, the distorsions caused by the heat of welding will rather be absorbed by the flange portions 7 than by the skin 1 as proven by welding tests to produce such skin welded joint.

The rib portions 6 extend longitudinally along the opposite lateral edges respectively of the flange 3 and the flange portions 7 transversely extend edgewise outwardly from the same opposite lateral edges and relative to the rib portions.

The outer longitudinal edge portions 9 are arc welded to the skin 1 by preferably chain staggered welds.

The aforementioned spaces defined between the inner one face of the skin 1 and the external side 8 and inner portions 10 are in the order of 1 mm. for a 2 to 2.5 mm skin and of 1.5 mm for a 3 to 5 mm skin.

The skin 1 thus welded has a portion between and close to the welds which is effective as a flange in the resulting joint and whose original hardening is not annihilated.

Figure 4:
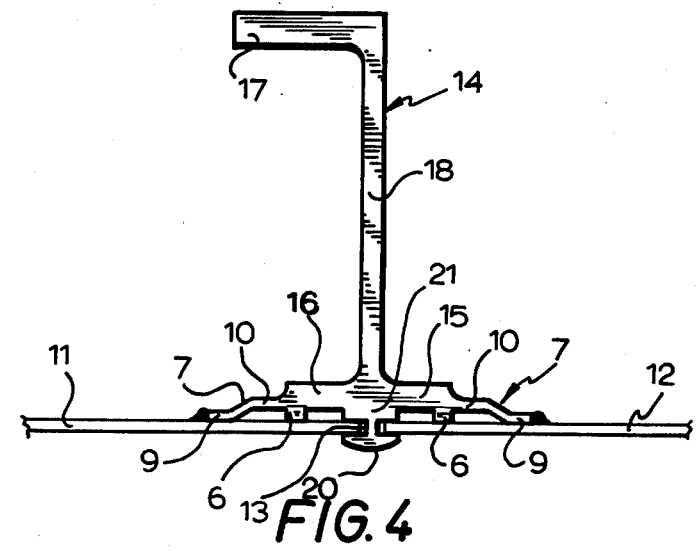
FIG. 4 is an end view of the frame member of FIG. 3 operatively welded against one face of a metallic skin and cooperatively forming therewith a skin welded joint according to the second embodiment of the present invention.

The skin welded joint in the embodiment illustrated in FIG. 4 is adapted for a skin which is formed by a pair of metallic sheets 11, 12 which are positioned in butt joint relationship relative one to the other and separated edgewise from each other by a seam space or longitudinal gap 13. In this embodiment, the skin welded joint includes an elongated frame member 14, which as the frame member 2 is also preferably of extruded aluminum. The sheets 11, 12 are also preferably of aluminum and of uniform thickness throughout.

Figure 1:
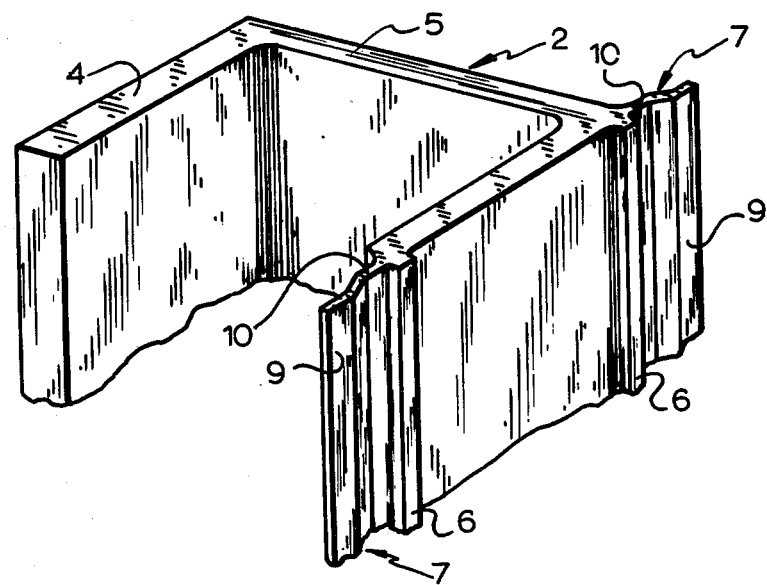
FIG. 1 is a perspective view of one end of a metallic frame member to form part of a skin welded joint according to one embodiment of the present invention.

The elongated metallic frame member 14 has also the general shape of a channel member but with an additional flange 15 relative to an otherwise channel shape defined by a pair of parallel flanges 16 and 17 and an interconnecting web 18. The flanges 15 and 16 are coplanar and project on the opposite sides respectively of the web 18. The frame member 14 includes a pair of rib portions 6 and a pair of flange portions 7 as afore described in relation to the first embodiment illustrated in FIGS. 1 and 2. However, in this second embodiment the rib portions 6 and flange portions 7 project from the free outer edge of the pair of flanges 15 and 16 rather than from the opposite lateral edges of a sole flange 3, as in FIG. 2.

The frame member 14 also includes a longitudinal ridge portion 19 laterally projecting from the external side defined by the flanges 15 and 16 and having an outer head portion 20 adapted to conceal the seam space on the external face of the thin metallic skin formed by the metal sheets 11 and 12. The longitudinal ridge portion 19 is of H shape transverse cross section defining an inner side 21 extending flat against the flanges 15 and 16, an outer side defining said outer head portion 20 and overlapping the adjacent edges of the metallic sheets 11 and 12 at the butt joint, and an interconnecting portion extending through the seam space between these adjacent edges.

It should be readily understood that the profile or shape of the frame member may be changed without departing from the principle of the present invention and the scope defined by the appended claims. For instance, the frame member need not be an elongated member such as a post or beam, and if an elongated member it may include a main body which has any suitable transverse cross section such an angle or H shape.

It must be noted that the aforementioned smaller thickness of the inner longitudinal edge portions 10 may be produced by these portions having a uniform thickness or having one or more grooves longitudinally thereof.

What is claimed is:

1. A skin welded joint comprising a thin metallic skin, a metallic frame member securable in contact with one face of said thin metallic skin and including a main body portion, at least one rib portion, and at least one flange portion, said rib portion projecting from one side of said main body portion and operatively abutting against said one face of the thin metallic skin, and said flange portion including an outer edge portion operatively contacting said one face of the thin metallic skin and being welded thereto, and an inner portion extending intermediate said outer edge portion and said rib portion, operatively spaced from said one face of the metallic skin, having a smaller thickness than said main body portion and being readily deformable under the heat of welding.

2. A skin welded joint as defined in claim 1, wherein said main body portion constitutes one flange of an elongated frame member, said one side of the main body portion constitutes the external side of said one flange, and said one rib portion and said one flange portion project a predetermined distance from said one external side.

3. A skin welded joint as defined in claim 1, wherein said metallic frame member includes another rib portion projecting from said one side of said main body portion and operatively abutting against said one face of the thin metallic skin.

4. A skin welded joint as defined in claim 2, wherein said metallic frame member includes another rib portion projecting from said external side of said one flange, said rib portions extend longitudinally along the opposite edges respectively of said external side, and said flange portion extend externally relative to said rib portion.

5. A skin welded joint as defined in claim 4, wherein said metallic frame member includes another flange portion extending externally relative to said rib portions and on opposite side of the latter relative to said one rib portion, said another flange portion includes an outer edge portion operatively contacting said one face of the thin metallic skin and being welded thereto, and an inner edge portion extending intermediate the corresponding outer edge portion and one of said rib portions, operatively spaced from said one face of the metallic skin, having a smaller thickness than said flange and being readily deformable under the heat of welding.

6. A skin welded joint as defined in claim 5, wherein both of said flange portions laterally project outwardly of said flange and in laterally opposite directions.

7. A skin welded joint as defined in claim 6, wherein said metallic frame member constitutes an elongated extrusion frame member integrally forming said one flange, rib portions, and flange portions.

8. A skin welded joint as defined in claim 7, wherein said thin metallic skin includes a pair of metallic sheets positioned in butt joint relationship relative one to the other and separated edgewise from each other by a seam space and said elongated frame member includes a ridge portion extending longitudinally thereof, projecting into said seam space, and having an outer head portion concealing the seam space on the other face of the thin metallic skin.

9. A skin welded joint as defined in claim 8, wherein said ridge portion is of H-shaped transverse cross section defining an inner side extending flat against said one flange, an outer side defining said outer head portion and overlapping the adjacent edges of said metallic sheets at said butt joint.

10. A skin welded joint as defined in claim 1, wherein said metallic frame member constitutes an elongated extrusion frame member integrally forming a flange constituting said main body portion, said one rib portion, and said one flange portion.

* * * * *